July 25, 1933.　　　　W. E. NYCE　　　　1,919,902
INTERCELL CONNECTER
Filed Feb. 16, 1929
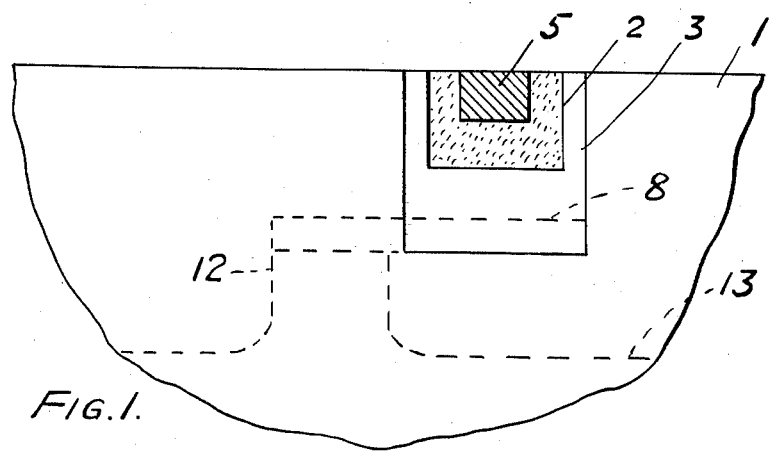
Fig. 1.
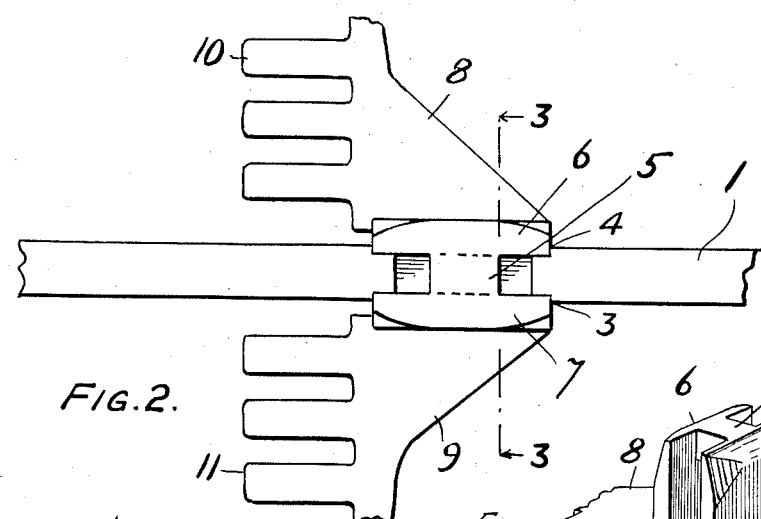
Fig. 2.
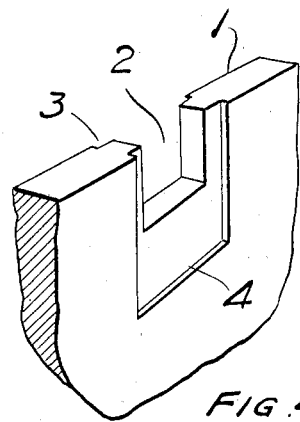
Fig. 4.
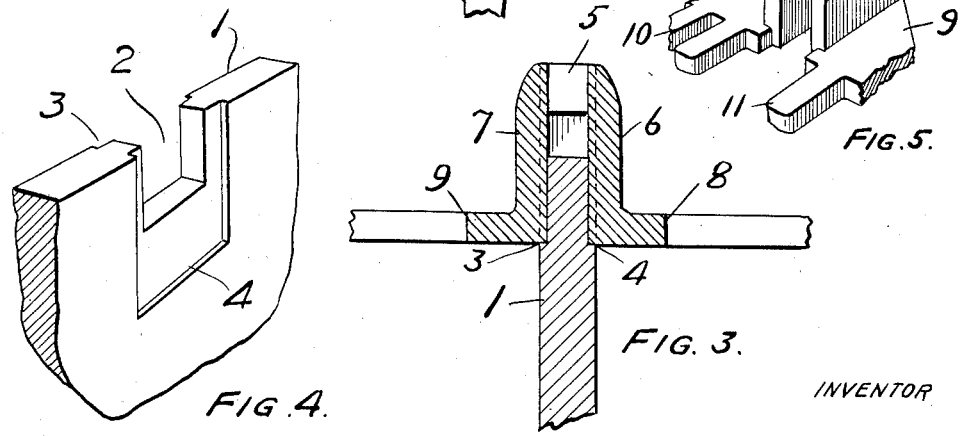
Fig. 3.
Fig. 5.
WITNESS:
Rob R Mitchel
INVENTOR
Wallace E. Nyce
BY
Augustus B Stoughton
ATTORNEY.

Patented July 25, 1933

1,919,902

UNITED STATES PATENT OFFICE

WALLACE E. NYCE, OF PHILADELPHIA, PENNSYLVANIA

INTERCELL CONNECTER

Application filed February 16, 1929. Serial No. 340,523.

The object of my invention is to produce an improved intercell connecter for use in storage batteries. My connecter is so designed as to cooperate with the partition wall of a storage battery at the point where it passes therethrough. It is intended to provide a space between the partition wall and the connecter for the introduction of sealing compound to prevent the creeping of electrolyte between the cells of a storage battery which are separated by the partition wall.

There is thus provided a simplified intercell connecter which provides for more convenient and economical assembly of a storage battery.

Other objects of my invention will appear from the annexed drawing and specification at the end whereof my invention will be claimed.

In the drawing,

Figure 1 represents a vertical elevation of a partition wall and an intercell connecter, part of the connecter being broken away.

Figure 2 represents a plan view of a partition wall and an intercell connecter.

Figure 3 represents a cross section on line 3—3 of Figure 2.

Figure 4 is a projection view of a portion of the upper edge of a partition wall as adapted to receive my improved intercell connecter.

Figure 5 is a detailed projection view showing the center or yoke portion of a connecter.

Referring to the drawing, 1 represents a partition wall of a storage battery which serves to separate two of the cells into which a storage battery is divided. In the upper edge of such a wall 1 is formed a notch or opening 2 adjacent to which are formed shouldered notches 3 and 4. An intercell connecter is a metallic element adapted to connect the lugs or ears on a set of plates in one cell of a storage battery with the lugs or ears in another set of plates in an adjacent cell of a storage battery. Such an intercell connecter consists of a yoke element 5 of reduced cross section situated between two larger shouldered members 6 and 7 which are so designed as to fit snugly into the shouldered notches or openings 3 and 4 respectively. From shoulders 6 and 7 project horizontally flanged members 8 and 9 which carry fork, comb or teeth like elements 10 and 11 respectively, which are adapted to receive the lugs or ears 12 on the storage battery plates 13 between them. The lugs or ears on the plates are fastened to the elements 10 and 11 by melting the metal, of which they are both composed, together.

The small yoke 5, in operation, is situated in the enlarged opening 2 between the shouldered portions 6 and 7 which fit quite snugly down into the openings 3 and 4 as best shown in Figure 3. Shoulders 6 and 7 together with the walls of the opening 2 and the yoke 5 form an opening of U-shaped cross section, as appears in Figure 1, which is adapted to contain sealing compound of a gummy or waxy nature which is poured therein while hot and which serves to thoroughly seal any small openings adjacent to the connecter so as to prevent the passage of electrolyte from one cell to the other by flowing or creeping along the surface of the partition wall or of the connecter.

The above is a preferred embodiment of my invention in the practice of which I do not intend to be limited save by the prior art and the attached claims.

I claim:

1. In a storage battery the combination of a partition wall having an opening in the upper edge thereof and shouldered notches adjacent to said opening and an intercell connecter having a yoke adapted to be located in said opening but spaced from the walls of said opening and having shoulders adapted to contact with the shoulders on the partition wall so as to form an opening between the yoke and shoulders of the intercell connecter and the upper surface of the partition wall said opening being adapted to contain sealing compound, and sealing compound in said opening.

2. In a storage battery, the combination of a partition wall having a notch in its upper edge, an intercell connecter passing through said notch but spaced from the walls of said notch, said intercell connecter having thereon shoulders contacting the opposite vertical faces of the wall around the notch, said connecter and the walls of said notch and said shoulders defining a space therebetween which is completely enclosed except at the top of the wall, and sealing compound filling said space.

WALLACE E. NYCE.